(12) United States Patent
Nakasaka

(10) Patent No.: US 9,441,602 B2
(45) Date of Patent: Sep. 13, 2016

(54) IGNITION TIMING CONTROL SYSTEM FOR A SPARK IGNITION TYPE INTERNAL COMBUSTION ENGINE

(71) Applicant: Yukihiro Nakasaka, Sunto-gun (JP)

(72) Inventor: Yukihiro Nakasaka, Sunto-gun (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 251 days.

(21) Appl. No.: 14/220,530

(22) Filed: Mar. 20, 2014

(65) Prior Publication Data

US 2014/0283786 A1 Sep. 25, 2014

(30) Foreign Application Priority Data

Mar. 22, 2013 (JP) ................................. 2013-060523

(51) Int. Cl.
| | |
|---|---|
| F02P 5/145 | (2006.01) |
| F02P 5/152 | (2006.01) |
| F02P 5/153 | (2006.01) |
| F02D 13/02 | (2006.01) |
| F02D 35/02 | (2006.01) |
| F02D 15/04 | (2006.01) |
| F01L 1/344 | (2006.01) |

(52) U.S. Cl.
CPC ........... *F02P 5/145* (2013.01); *F02D 13/0238* (2013.01); *F02D 13/0269* (2013.01); *F02D 15/04* (2013.01); *F02D 35/028* (2013.01); *F02P 5/152* (2013.01); *F02P 5/153* (2013.01); *F01L 1/3442* (2013.01); *F01L 2001/3443* (2013.01); *F02D 2200/021* (2013.01); *F02D 2200/0414* (2013.01); *F02D 2200/0611* (2013.01); *Y02T 10/142* (2013.01); *Y02T 10/46* (2013.01)

(58) Field of Classification Search
CPC .... F02D 35/027; F02D 35/028; F02D 41/00; F02P 5/145; F02P 5/152; F02P 5/153; Y02T 10/46
USPC ............ 701/103–105, 110, 111; 123/406.11, 123/406.16, 406.19, 406.21, 406.25, 406.36
See application file for complete search history.

(56) References Cited

U.S. PATENT DOCUMENTS

| | | | | |
|---|---|---|---|---|
| 7,212,909 B2* | 5/2007 | Yoshino | ............... | F02D 35/028 123/406.37 |
| 7,472,687 B2* | 1/2009 | Zhu | ........................ | F02P 17/12 123/406.14 |
| 7,712,450 B2* | 5/2010 | Sato | ........................ | F02P 5/152 123/406.11 |
| 2002/0092488 A1* | 7/2002 | Aoyama | ............. | F01L 13/0021 123/90.16 |
| 2007/0199533 A1* | 8/2007 | Takahashi | ............... | F02D 17/04 123/179.4 |
| 2012/0035835 A1* | 2/2012 | Glugla | ................. | F02D 35/027 701/111 |

FOREIGN PATENT DOCUMENTS

| | | |
|---|---|---|
| JP | 2011-256725 A | 12/2011 |
| WO | 2014010022 A1 | 1/2014 |

OTHER PUBLICATIONS

Co-pending U.S. Appl. No. 14/413,258, filed Jan. 7, 2015 (corresponds to PCT/JP2012/067504 filed Jul. 9, 2012 and published as WO2014/010022A1).

* cited by examiner

*Primary Examiner* — John Kwon
*Assistant Examiner* — Johnny H Hoang
(74) *Attorney, Agent, or Firm* — Dinsmore & Shohl LLP

(57) ABSTRACT

A base in-cylinder volume is corrected by a learned value to calculate a corrected in-cylinder volume. A difference of a crank angle which gives the corrected in-cylinder volume and the base crank angle is calculated as a "crank angle correction value", and a base ignition timing is corrected by the crank angle correction value and feedback correction value. An in-cylinder volume at a crank angle where a combustion ratio became a set ratio at the previous combustion is calculated as a "previous in-cylinder volume VFp", a difference ΔVFp of the previous in-cylinder volume VFp with respect to the base in-cylinder volume VBp at the previous combustion is calculated, and the learned value ΔVL is updated based on the in-cylinder volume difference VFp.

4 Claims, 14 Drawing Sheets

FIG. 16A

| Ta | Ta$_1$ | ............ | Ta$_n$ |
|---|---|---|---|
| $\Delta$vd1 | $\Delta$vd1$_1$ | ............ | $\Delta$vd1$_n$ |

FIG. 16B

| THW | THW$_1$ | ............ | THW$_n$ |
|---|---|---|---|
| $\Delta$vd2 | $\Delta$vd2$_1$ | ............ | $\Delta$vd2$_n$ |

FIG. 19A

| Ta  | Ta$_1$  | .................... | Ta$_n$  |
|-----|---------|----------------------|---------|
| rd1 | rd1$_1$ | .................... | rd1$_n$ |

FIG. 19B

| THW | THW$_1$ | .................... | THW$_n$ |
|-----|---------|----------------------|---------|
| rd2 | rd2$_1$ | .................... | Rd2$_n$ |

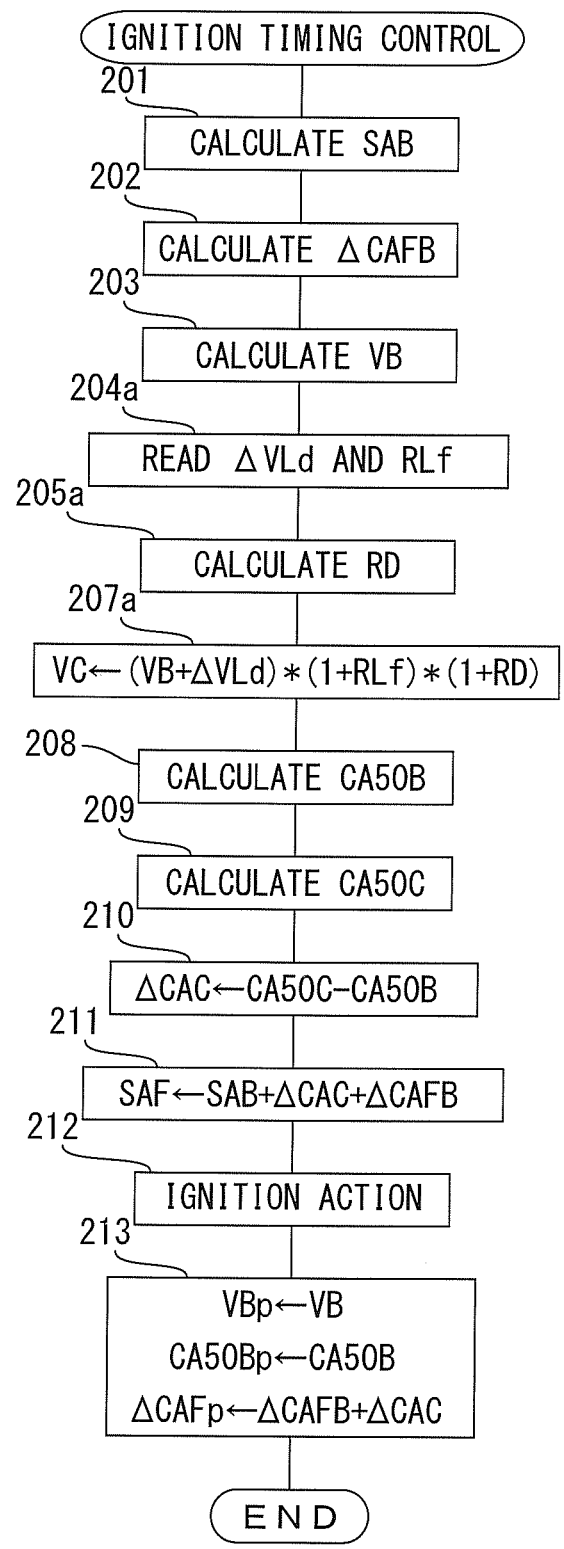

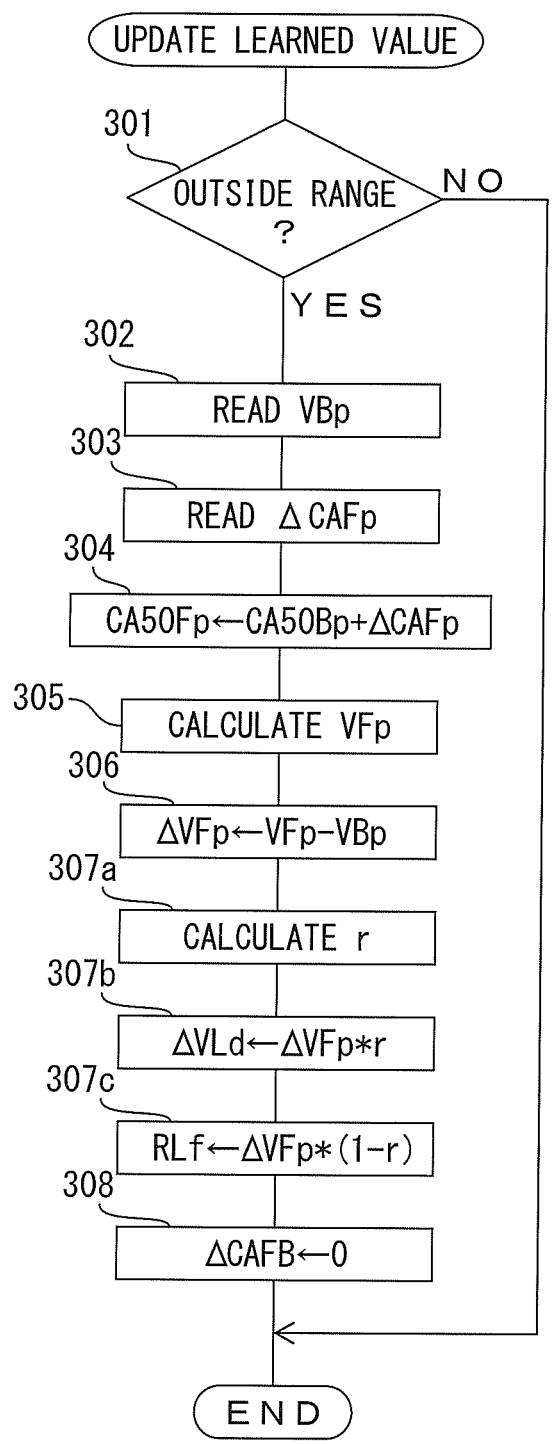

IGNITION TIMING CONTROL SYSTEM FOR A SPARK IGNITION TYPE INTERNAL COMBUSTION ENGINE

BACKGROUND OF THE INVENTION

1. Field of the Invention

The present invention relates to a spark ignition type internal combustion engine.

2. Related Art

Known in the art is an ignition timing control system of an internal combustion engine which uses the engine operating state as the basis to calculate a base ignition timing, calculates a feedback correction value for correcting the base ignition timing so that the level of knocking which is detected by the knocking sensor becomes a target value, and corrects the base ignition timing by the feedback correction value and a learned value (see Japanese Patent Publication No. 2011-256725A). It is not preferable in control for the feedback correction value to steadily deviate from the reference value. Therefore, in Japanese Patent Publication No. 2011-256725A, the steady difference of the feedback correction value with respect to the reference value is set as the learned value and the base ignition timing is corrected by the feedback correction value and learned value. As a result, the feedback correction value is kept from steadily deviating from the reference value.

In Japanese Patent Publication No. 2011-256725A, the learned value is set in relation to the engine operating state which is determined by the engine load and the engine speed.

SUMMARY OF THE INVENTION

However, the level of knocking depends on the state of combustion. The engine parameters which affect the state of combustion are not limited to the engine load and engine speed. For example, in an internal combustion engine in which the mechanical compression ratio can be changed, if the mechanical compression ratio is changed, the state of combustion is changed, so the level of knocking is changed. For this reason, in an internal combustion engine in which the mechanical compression ratio can be changed, even if using the learned value which is described in Japanese Patent Publication No. 2011-256725A to control the ignition timing, the level of knocking is liable to be unable to be maintained at the target level. In an internal combustion engine in which the closing timing of the intake valve can be changed as well, if the closing timing of the intake valve is changed, the level of knocking is changed, so a similar problem can occur.

If setting the learned value while considering the mechanical compression ratio or the closing timing of the intake valve, that is, the configuration of the internal combustion engine, this problem might be able to be solved. However, it would be extremely difficult and impractical to set the learned value in relation to all parameters which would be liable to affect the knocking.

According to the present invention, there is provided a spark ignition type internal combustion engine which uses the engine operating state as the basis to calculate a base ignition timing, calculates a feedback correction value for correcting the base ignition timing so that a level of knocking which is detected by a knock sensor becomes a target level, calculates the crank angle by which the combustion ratio becomes a predetermined set ratio when assuming combustion was performed by the base ignition timing as a "base crank angle" and an in-cylinder volume at the base crank angle as a "base in-cylinder volume", corrects the base in-cylinder volume by a learned value so as to calculate a corrected in-cylinder volume, calculates the crank angle by which the corrected in-cylinder volume is obtained as a "corrected crank angle", calculates a difference of the corrected crank angle from the base crank angle as a "crank angle correction value", and corrects the base ignition timing by the feedback correction value and crank angle correction value, the spark ignition type internal combustion engine calculating an in-cylinder volume at the crank angle by which the combustion ratio becomes a set ratio in the previous combustion as a "previous in-cylinder volume", calculating a difference of the previous in-cylinder volume from the base in-cylinder volume at the previous combustion, and updating the learned value based on the difference.

The present invention may be more fully understood from the description of the preferred embodiments according to the invention as set forth below, together with the accompanying drawings.

BRIEF DESCRIPTION OF THE DRAWINGS

In the drawings:

FIGS. 16A and 16B are views which show maps of correction values $\Delta vd1$ and $\Delta vd2$.

FIGS. 19A and 19B are views which show maps of correction values rd1, rd2.

FIG. 20 is a view which shows a map of a distribution coefficient "r".

FIG. 21 is a flow chart of an ignition timing control routine of another embodiment according to the present invention.

FIG. 22 is a flow chart of a learned value calculation routine of another embodiment according to the present invention.

DESCRIPTION OF THE PREFERRED EMBODIMENTS

Figure 1:
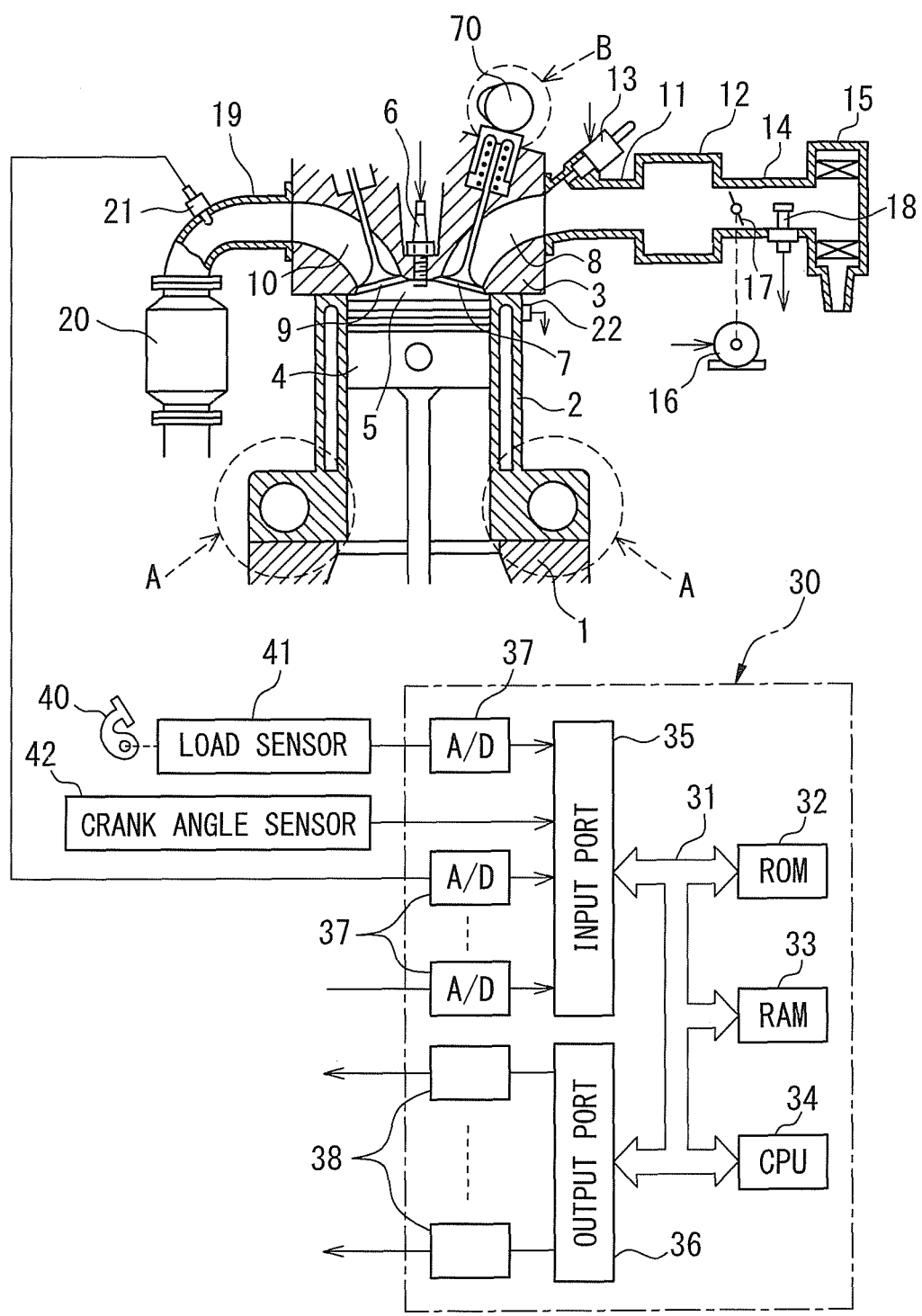
FIG. 1 is an overall view of a spark ignition type internal combustion engine.

FIG. 1 is a side cross-sectional view of a spark ignition type internal combustion engine.

Referring to FIG. 1, 1 indicates a crankcase, 2 a cylinder block, 3 a cylinder head, 4 a piston, 5 a combustion chamber, 6 a spark plug which is arranged at the top center of the combustion chamber 5, 7 an intake valve, 8 an intake port, 9 an exhaust valve, and 10 an exhaust port. The intake port 8 is coupled through an intake runner 11 to a surge tank 12. At each intake runner 11, a fuel injector 13 is arranged for injecting fuel toward the corresponding intake port 8. Note that a fuel injector 13 may also be arranged in each combustion chamber 5 instead of at each intake runner 11.

The surge tank 12 is connected with an air cleaner 15 through an intake duct 14. Inside the intake duct 14, a throttle valve 17 which is driven by an actuator 16 and an intake air amount detector 18 which uses for example hot wires are arranged. On the other hand, the exhaust port 10 is connected through an exhaust manifold 19 to a catalyst converter 20 which has for example a three-way catalyst built into it. Inside the exhaust manifold 19, an air-fuel ratio sensor 21 is arranged. Further, the cylinder block 2 is provided with a knock sensor 22 for detecting the level of knocking.

On the other hand, in the embodiment which is shown in FIG. 1, at the connecting part of the crankcase 1 and the cylinder block 2, a variable compression ratio mechanism A is provided which can change the relative positions of the crankcase 1 and the cylinder block 2 in the cylinder axial direction to as to change the mechanical compression ratio. Further, a variable valve timing mechanism B which can control the closing timing of the intake valve 7 is provided for controlling the intake air amount which is actually fed to the combustion chamber 5. Note that the mechanical compression ratio is defined as the ratio of the in-cylinder volume when the piston is at compression bottom dead center to the in-cylinder volume when the piston is at compression top dead center.

An electronic control unit 30 is comprised of a digital computer. This is provided with components connected to each other through a bidirectional bus 31 such as a ROM (read only memory) 32, RAM (random access memory) 33, CPU (microprocessor) 34, input port 35, and output port 36. An output signal of the intake air amount detector 18, an output signal of the air-fuel ratio sensor 21, and an output signal of the knock sensor 22 are input through respectively corresponding AD converters 37 to an input port 35. Further, the accelerator pedal 40 is connected to a load sensor 41 which generates an output voltage which is proportional to the amount of depression L of the accelerator pedal 40. The output voltage of the load sensor 41 is input through a corresponding AD converter 37 to the input port 35. Furthermore, the input port 35 is connected to a crank angle sensor 42 which generates an output pulse each time a crankshaft rotates by for example 30°. On the other hand, the output port 36 is connected through a corresponding drive circuit 38 to each spark plug 6, fuel injector 13, an actuator 16 for driving the throttle valve, variable compression ratio mechanism A, and variable valve timing mechanism B.

Figure 2:
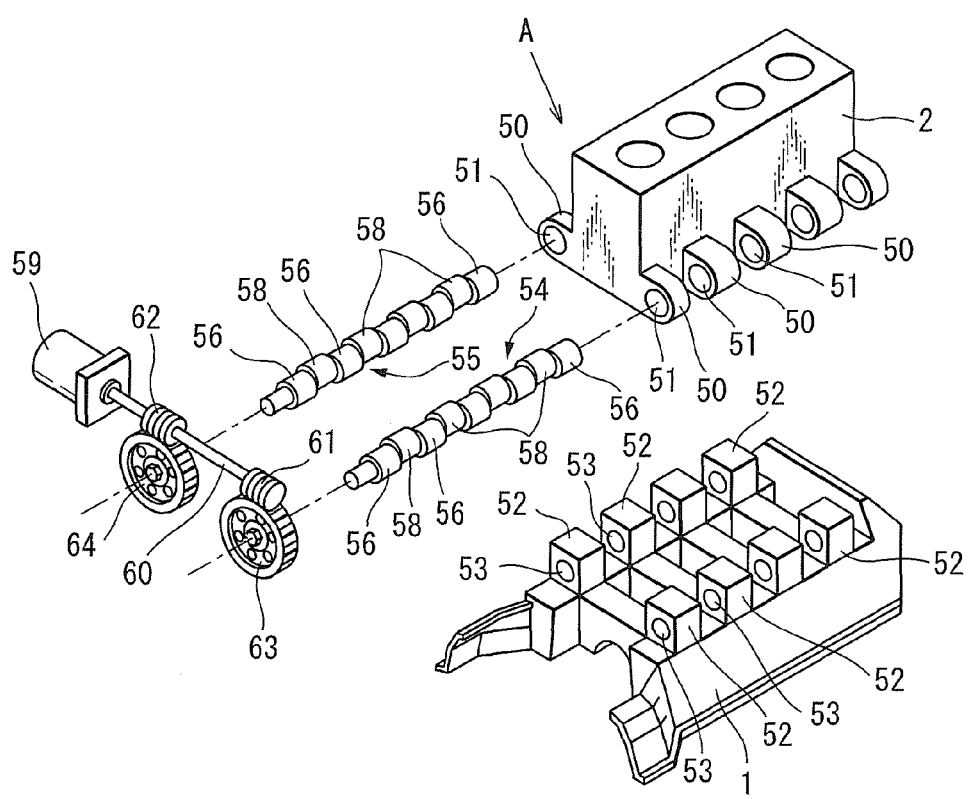
FIG. 2 is a disassembled perspective view of a variable compression ratio mechanism.
Figure 3A:
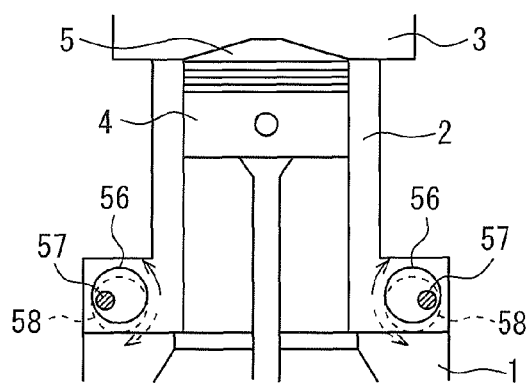
FIGS. 3A and 3B are side cross-sectional views of an internal combustion engine expressed schematically.
Figure 3B:
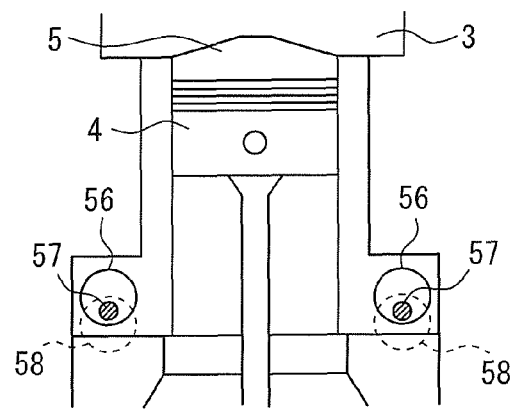

FIG. 2 is a disassembled perspective view of the variable compression ratio mechanism A which is shown in FIG. 1, while FIGS. 3A and 3B are a side cross-sectional view of the illustrated internal combustion engine. Referring to FIG. 2, at the bottom of the two sides of the cylinder block 2, a plurality of projecting parts 50 are formed spaced apart from each other. Inside these projecting parts 50, cam insertion holes 51 of round cross-sectional shapes are formed. On the other hand, at the top surface of the crankcase 1, a plurality of projecting parts 52 are formed which are spaced apart from each other and fit between the corresponding projecting parts 50. Inside these projecting parts 52 as well, round cross-section cam insertion holes 53 are formed.

As shown in FIG. 2, a pair of cam shafts 54 and 55 are provided. On these cam shafts 54 and 55, at every other position, a circular cam 56 which is inserted into a cam insertion hole 53 is fastened. These circular cams 56 are coaxial with the axes of rotation of the cam shafts 54 and 55. On the other hand, at the two sides of each circular cam 56, as shown in FIGS. 3A and 3B, eccentric shafts 57 extend arranged eccentrically with respect to the axes of the cam shafts 54 and 55. Other circular cams 58 are attached eccentrically on these eccentric shafts 57 in a rotatable manner. As shown in FIG. 2, these circular cams 58 are arranged between the individual circular cams 56. These circular cams 58 are rotatably inserted into the corresponding cam insertion holes 53.

If making the circular cams 56 which are fastened on the cam shafts 54 and 55 are made to rotate from the state such as shown in FIG. 3A in the mutually opposite directions as shown by the solid arrows in FIG. 3A, the eccentric shafts 57 move toward the bottom center, so the circular cams 58 rotate in opposite directions from the circular cams 56 in the cam insertion holes 53 as shown by the broken line arrows in FIG. 3A. When the eccentric shafts 57 move to the bottom centers as shown in FIG. 3B, the centers of the circular cams 58 move below the eccentric shafts 57.

As will be understood from a comparison of FIG. 3A to FIG. 3B, the relative positions of the crankcase 1 and the cylinder block 2 are determined by the distance between the centers of the circular cams 56 and the centers of the circular cams 58. The larger the distance between the centers of the circular cams 56 and the centers of the circular cams 58, the more the cylinder block 2 separates from the crankcase 1. 2. If the cylinder block 2 moves away from the crankcase 1, the volume of the combustion chamber 5 when the piston 4 is positioned at compression top dead center increases. Therefore, by rotating the cam shafts 54 and 55, the volume of the combustion chamber 5 when the piston 4 is positioned at compression top dead center can be changed. As shown in FIG. 2, to make the cam shafts 54 and 55 rotate in opposite directions, the shaft 60 of a drive motor 59 is formed with a pair of worms 61 and 62 with opposite spiral directions. The worm gears 63 and 64 which engage with these worms 61 and 62 are fastened to the ends of the cam shafts 54 and 55. In this embodiment, by operating the drive motor 59, the volume of the combustion chamber 5 when the piston 4 is positioned at compression top dead center can be changed over a wide range. Note that the variable compression ratio mechanism A which is shown from FIG. 1 to FIG. 3B is one example. Any type of variable compression ratio mechanism can be used.

Figure 4:
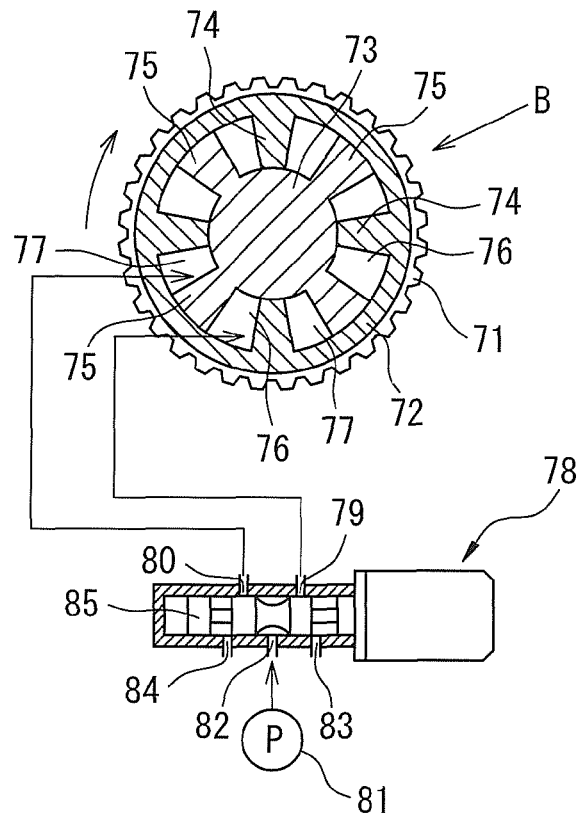
FIG. 4 is a view which shows a variable valve timing mechanism.

On the other hand, FIG. 4 shows a variable valve timing mechanism B which is attached to an end of a cam shaft 70 for driving the intake valve 7 in FIG. 1. Referring to FIG. 4, this variable valve timing mechanism B is provided with a timing pulley 71 which is made to rotate in the arrow direction by a crankshaft of the engine through a timing belt, a cylindrical housing 72 which rotates together with the timing pulley 71, a shaft 73 which can rotate relative together with the cam shaft 70 for driving the intake valve and can rotate relative to the cylindrical housing 72, a plurality of partition walls 74 which extend from the inner circumference of the cylindrical housing 72 to the outer circumference of the shaft 73, and vanes 75 which extend between the partition walls 74 from the outer circumference of the shaft 73 to the inner circumference of the cylindrical housing 72.

The feed of working oil to the hydraulic chambers 76 and 77 is controlled by a working oil feed control valve 78. This working oil feed control valve 78 is provided with hydraulic ports 79 and 80 which are respectively connected to the hydraulic chambers 76 and 77, a feed port 82 of working oil which is discharged from the hydraulic pump 81, a pair of drain ports 83 and 84, and a spool valve 85 which controls the connections/disconnections of the ports 79, 80, 82, 83, and 84.

When advancing the phase of the cams of the cam shaft 70 for driving the intake valve, the spool valve 85 is made to move to the right in FIG. 4, working oil which is fed from the feed port 82 is fed through a hydraulic port 79 to the hydraulic chamber 76 for advance, and the working oil inside the hydraulic chamber 77 for retard is drained from a drain port 84. At this time, the shaft 73 is made to rotate relative to the cylindrical housing 72 in the arrow direction.

As opposed to this, when retarding the phase of the cam of the cam shaft 70 for driving the intake valve, the spool valve 85 is made to move to the left in FIG. 4, working oil which is fed from the feed port 82 is fed through a hydraulic port 80 to the hydraulic chamber 77 for retard, and the working oil inside the hydraulic chamber 76 for advance is drained from a drain port 83. At this time, the shaft 73 is made to rotate relative to the cylindrical housing 72 in a direction opposite to the arrow.

When the shaft 73 is made to rotate relative to the cylindrical housing 72, if the spool valve 85 is returned to the neutral position which is shown in FIG. 4, the relative rotation operation of the shaft 73 is made to stop and the shaft 73 is held at the relative rotation position at that time. Therefore, the variable valve timing mechanism B can be used to make the phase of the cams of the cam shaft 70 for driving the intake valve advance and be retarded by a desired amount.

Figure 5:
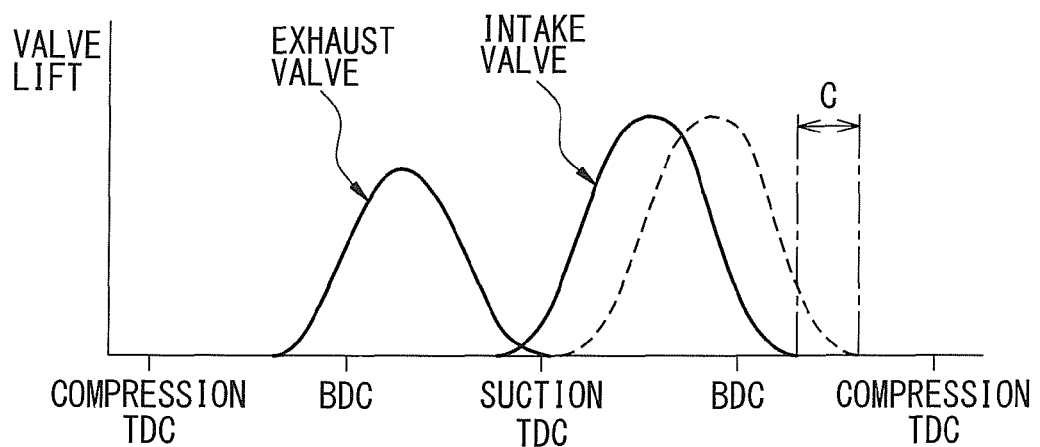
FIG. 5 is a view which shows amounts of lift of an intake valve and exhaust valve.

In FIG. 5, the solid line shows when the variable valve timing mechanism B makes the phase of the cams of the cam shaft 70 for driving the intake valve advance the most, while the broken line shows when it makes the phase of the cams of the cam shaft 70 for driving the intake valve be retarded the most. Therefore, the opening interval of the intake valve 7 can be freely set between the range shown by the solid line and the range shown by the broken line in FIG. 5. Therefore, the closing timing of the intake valve 7 also can be set to any crank angle in the range shown by the arrow C in FIG. 5.

The variable valve timing mechanism B which is shown in FIG. 1 and FIG. 4 shows one example. For example, it is possible to use a variable valve timing mechanism which can change only the closing timing of the intake valve while maintaining the opening timing of the intake valve constant and various other types of variable valve timing mechanisms.

In the embodiment according to the present invention, for example, the following cycles are performed. That is, when the engine load is higher than the first set load, a cycle is performed where the intake air amount is controlled by maintaining the mechanical compression ratio at a predetermined compression ratio or less and maintaining the closing timing of the intake valve at the side near suction bottom dead center while controlling the throttle opening degree. When the engine load is lower than a first set load and is higher than a second set load which is set lower than the first set load, a cycle is performed where the intake air amount is controlled by maintaining the mechanical compression ratio at a predetermined compression ratio or more, for example, at the maximum mechanical compression ratio, and maintaining the throttle valve wide open while controlling the closing timing of the intake valve. When the engine load is lower than the second set load, a cycle is performed where the intake air amount is controlled by maintaining the mechanical compression ratio at a predetermined compression ratio or more and maintaining the closing timing of the intake valve at the side far from suction bottom dead center while controlling the throttle opening degree.

Now, in the embodiment according to the present invention, the ignition timing SAF is calculated from the following formula (1):

$$SAF = SAB + \Delta CAFB + \Delta CAC \tag{1}$$

In formula (1), SAB indicates the base ignition timing, $\Delta CAFB$ the feedback correction value, and $\Delta CAC$ the crank angle correction value.

Figure 6:
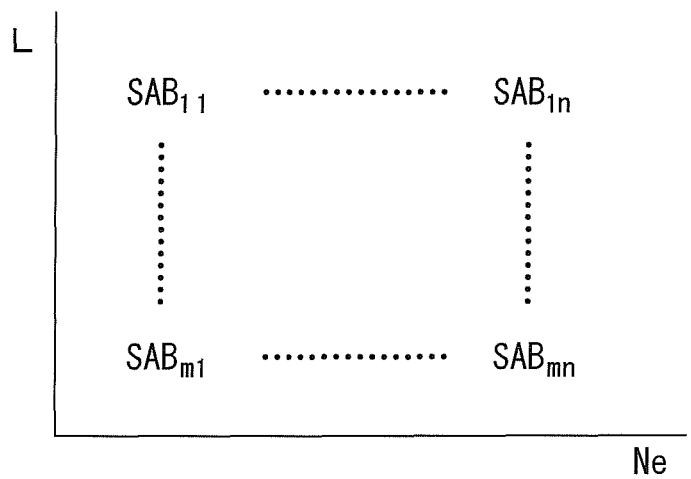
FIG. 6 is a view which shows a map of a base ignition timing SAB.

The base ignition timing SAB is the ignition timing which is required for making the level of knocking the target level when the engine state is the reference state and is stored as a function of the engine operating state, for example, the engine load L and engine speed Ne, in the form of the map which is shown in FIG. 6 in advance in the ROM 32. Note that the "reference state" means the state where the parameters which affect the level of knocking, such as the intake temperature, engine cooling water temperature, amount of deposits which form on the inside wall of the combustion chamber, and fuel properties such as the octane value, are at their corresponding reference values.

The feedback correction value $\Delta CAFB$ is for correcting the base ignition timing SAB when the level of knocking which is detected by the knock sensor 22 becomes the target level. It is set to the reference value zero when correction is not required.

Figure 7:
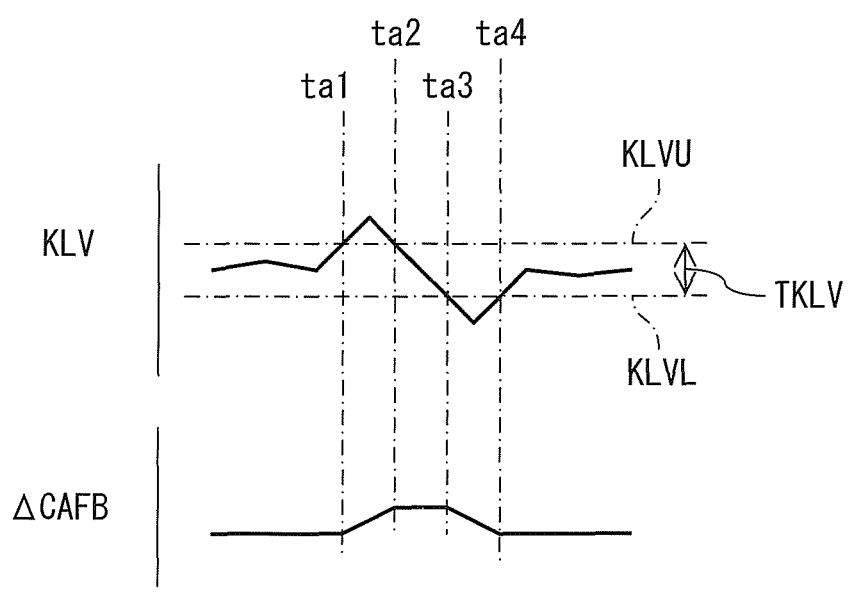
FIG. 7 is a time chart which explains a method of calculation of a feedback correction value.

That is, as shown in FIG. 7, if, at the time ta1, the level of knocking KLV becomes larger than the upper limit value KLVU of the target level TKLV, the feedback correction value $\Delta CAFB$ is increased. That is, the ignition timing SAF is retarded. Next, if, at the time ta2, the level of knocking KLV becomes the target level TKLV, the feedback correction value $\Delta CAFB$ is held. Next, if, at the time ta3, the level of knocking KLV becomes smaller than the lower limit value KLVL of the target level TKLV, the feedback correction value $\Delta CAFB$ is reduced. That is, the ignition timing SAF is advanced. Next, if, at the time ta4, the level of knocking KLV becomes the target level TKLV, the feedback correction value $\Delta CAFB$ is held.

Figure 8:
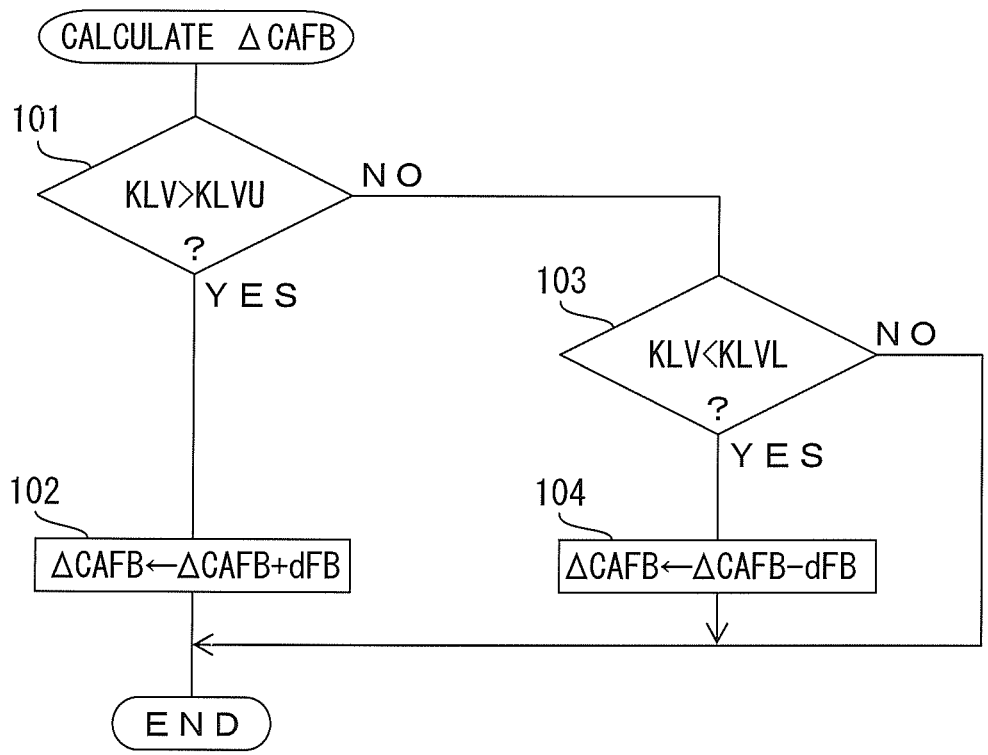
FIG. 8 is a flow chart which shows a routine for calculation of a feedback correction value.

FIG. 8 shows a routine for calculation of the feedback correction value $\Delta CAFB$. This routine is executed by interruption every certain time period.

Referring to FIG. 8, at step 101, it is judged if the level of knocking KLV is larger than the upper limit value KLVU. When KLV>KLVU, next, the routine proceeds to step 102 where the feedback correction value $\Delta CAFB$ is increased by a constant value dFB. As opposed to this, when KLV≤KLVU, next, the routine proceeds to step 103 where it is judged if the level of knocking KLV is smaller than the lower limit value KLVL. When KLV<KLVL, next the routine proceeds to step 104 where the feedback correction value ΔCAFB is reduced by a certain value dFB. As opposed to this, when KLV≥KLVL, the processing cycle is ended. That is, the feedback correction value ΔCAFB is held.

On the other hand, the crank angle correction value ΔCAC is a conversion of the later explained in-cylinder volume correction value ΔVC to the crank angle. It is set to the reference value zero when correction is not required.

Figure 9:
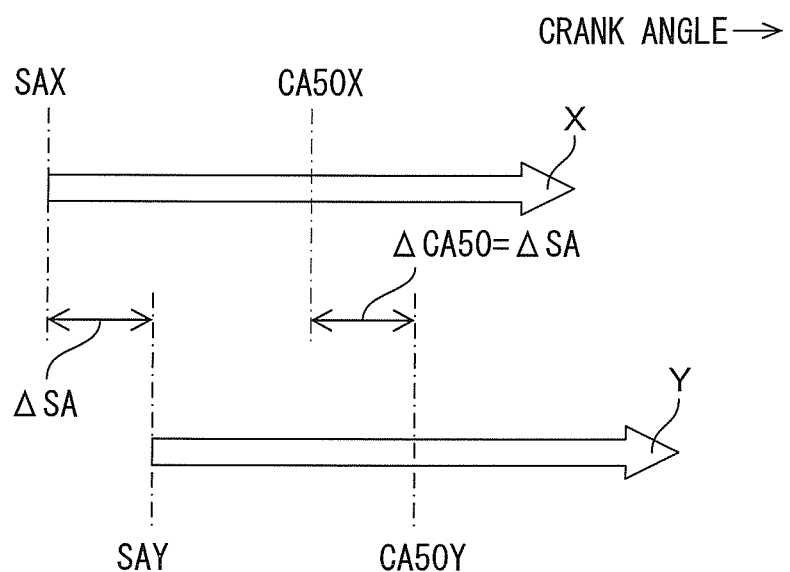
FIG. 9 is a graph which explains a relationship of a difference of ignition timing and a difference of crank angle by which a ratio of combustion becomes 50%.

In this regard, FIG. 9 schematically shows the combustion period X when combustion is performed by the ignition timing SAX. At this time, the crank angle at which the combustion ratio becomes a predetermined set ratio is shown by CA50X. In this embodiment according to the present invention, the set ratio is made 50%. Further, the combustion period Y when combustion is performed by the ignition timing SAY is schematically shown. At this time, the crank angle where the combustion ratio becomes 50% is shown by CA50Y. In the example which is shown in FIG. 9, at the combustion periods X, Y, the ignition timings differ by ΔSA (=SAY−SAX) and the crank angles where the combustion ratios become 50% differ by ΔCA50 (=CA50Y−CA50X).

In this embodiment according to the present invention, it is assumed that the difference ΔSA of the ignition timing and the difference ΔCA50 of the crank angle where the combustion ratio becomes 50% are equal to each other. Therefore, for example if the ignition timing is retarded by the constant crank angle ΔCA, the crank angle where the combustion ratio becomes 50% is also retarded by the constant crank angle ΔCA. In other words, to retard the crank angle where the combustion ratio becomes 50% by a constant crank angle ΔCA, it is sufficient to retard the ignition timing by ΔCA.

Note that if expressing the in-cylinder pressure and in-cylinder volume at any crank angle by P and V, expressing the in-cylinder pressure and in-cylinder volume at the time of start of combustion by P0 and V0, expressing the in-cylinder pressure and in-cylinder volume at the time of end of combustion by Pf and Vf, and expressing the specific heat ratio as κ, the combustion ratio (%) is expressed by the following formula (2).

$$\text{Combustion ratio (\%)} = (P \cdot V^\kappa - P0 \cdot V0^\kappa)/(Pf \cdot Vf^\kappa - P0 \cdot V0^\kappa) \cdot 100 \qquad (2)$$

Figure 10:
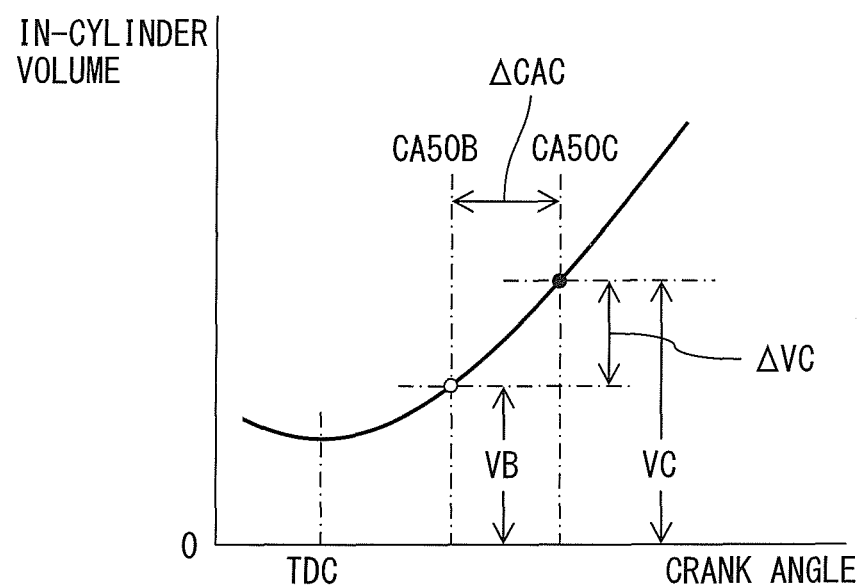
FIG. 10 is a graph which shows a relationship of a crank angle correction value $\Delta CAC$ and an in-cylinder volume correction values $\Delta VC$.

Next, referring to FIG. 10, control for correcting the ignition timing in an embodiment according to the present invention will be explained.

Figure 11:
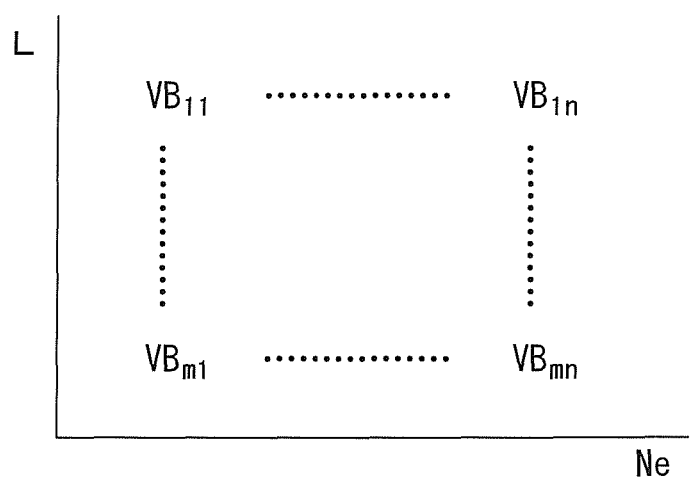
FIG. 11 is a view of a map of a base in-cylinder volume VB.

In this embodiment according to the present invention, first, if referring to the crank angle where the combustion ratio becomes 50% when assuming that combustion is performed by the base ignition timing SAB, that is, when assuming no correction is performed, as the "base crank angle CA50B", the in-cylinder volume at the base crank angle CA50B is calculated as the "base in-cylinder volume VB". The base in-cylinder volume VB is stored as a function of the engine operating state, for example, the engine load L and engine speed Ne, in the form of the map which is shown in FIG. 11 in advance in the ROM 32.

Next, the base in-cylinder volume VB is corrected to calculate the corrected in-cylinder volume VC.

Figure 12:
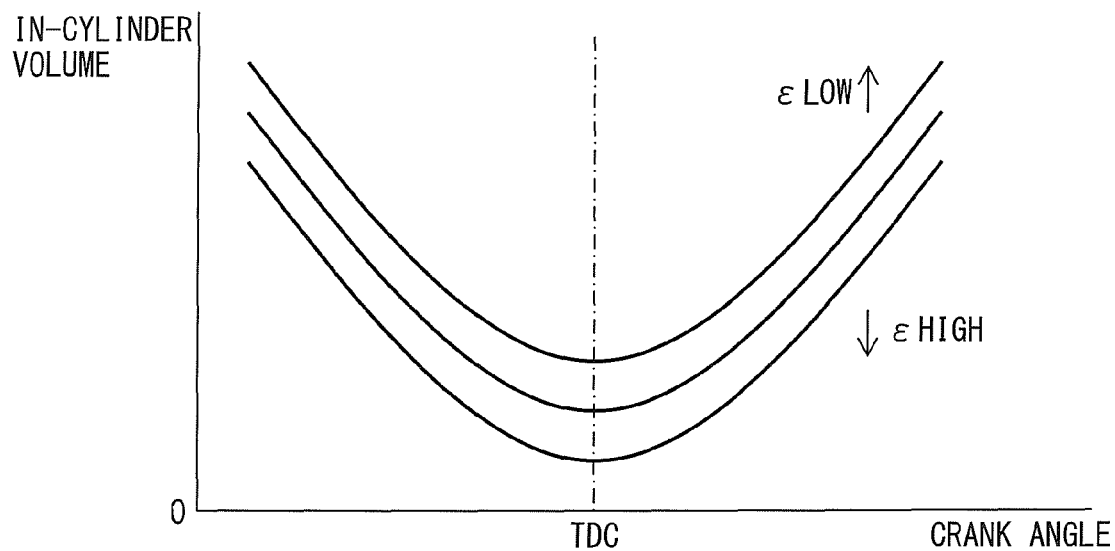
FIG. 12 is a view which shows a relationship among an in-cylinder volume, crank angle, and mechanical compression ratio $\epsilon$.

On the other hand, the base crank angle CA50B is calculated from the base in-cylinder volume VB and mechanical compression ratio ε. Further, the crank angle by which the corrected in-cylinder volume VC is obtained is calculated as the "corrected crank angle CA50C" from the corrected in-cylinder volume VC and mechanical compression ratio ε. In this embodiment according to the present invention, the relationship among the crank angle CA, in-cylinder volume V, and mechanical compression ratio ε are stored in the form of the map which is shown in FIG. 12 in advance in the ROM 32.

Next, the difference ΔCAC of the corrected crank angle CA50C from the base crank angle CA50B is calculated (ΔCAC=CA50C−CA50B). This difference ΔCAC is the crank angle which is necessary for changing the base in-cylinder volume VB to the corrected in-cylinder volume VC and is set to the above-mentioned crank angle correction value ΔCAC.

That is, to correct the base in-cylinder volume VB to the corrected in-cylinder volume VC, the base crank angle CA50B is corrected by the crank angle correction value ΔCAC. To correct the base crank angle CA50B by the crank angle correction value ΔCAC, the base ignition timing SAB is corrected by the crank angle correction value ΔCAC.

Figure 13:
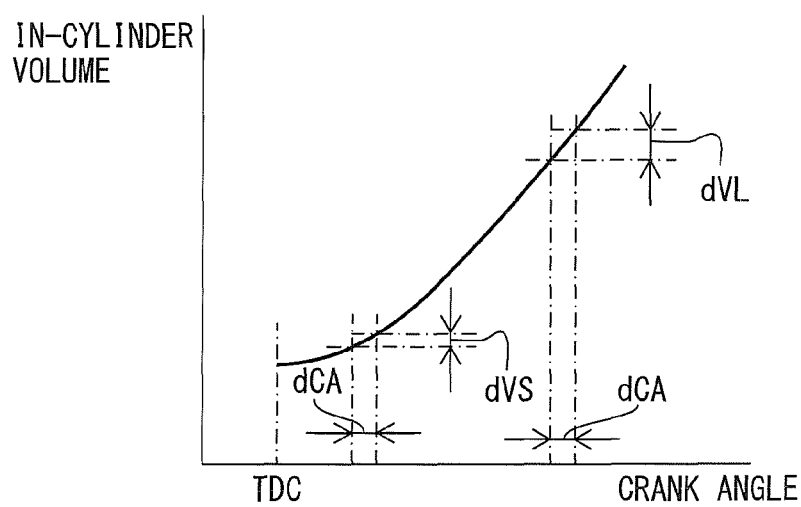
FIG. 13 is a graph which explains a difference of amount of change of in-cylinder volume.

In this way, in this embodiment according to the present invention, the base in-cylinder volume VB is corrected. This is done for the following reason. That is, according to the inventors etc., it is learned that the level of knocking is strongly correlated with the in-cylinder volume during the combustion period. Therefore, to accurately control the level of knocking, it is necessary to accurately control the in-cylinder volume in the combustion period. On the other hand, as shown in FIG. 13, the amount of change of the in-cylinder volume which is obtained by changing the crank angle by the constant value dCA differs according to the crank angle before the change. That is, when the crank angle is close to compression top dead center TDC, that is, when the crank angle is small, the in-cylinder volume changes by a comparatively small amount dVS, while when the crank angle is far from compression top dead center TDC, that is, when the crank angle is large, the in-cylinder volume changes by a relatively large amount dVL. For this reason, if correcting the base ignition timing VB simply by the crank angle dCA, when the base ignition timing SAB is small, the amount of change of the in-cylinder volume becomes small, while when the base ignition timing SAB is large, the amount of change of the in-cylinder volume ends up becoming large. As a result, it becomes difficult to maintain the in-cylinder volume at the combustion period at an in-cylinder volume which maintains the level of knocking at the target level.

Therefore, in this embodiment according to the present invention, the corrected in-cylinder volume VC is calculated, the crank angle which is necessary for changing the base ignition timing SAB to the corrected in-cylinder volume VC, is calculated as the "crank angle correction value ΔCAC", and the crank angle correction value ΔCAC is used to correct the base ignition timing SAB.

In the embodiment according to the present invention, the corrected in-cylinder volume VC is calculated in the following way. That is, first, the in-cylinder volume correction value ΔVC is calculated. Next, the corrected in-cylinder volume VC is calculated from the following formula (3).

$$VC = VB + \Delta VC \qquad (3)$$

In the embodiment according to the present invention, the in-cylinder volume correction value ΔVC is calculated from the following formula (4).

$$\Delta VC = \Delta VL + \Delta VD \qquad (4)$$

In formula (4), ΔVL indicates the learned value, while ΔVD indicates a disturbance correction value.

The learned value ΔVL is for compensating for disturbances which cannot be individually judged among the disturbances causing the engine state to deviate from the reference state, for example, the amount of deposits which form on the wall surface inside of a combustion chamber and the properties of the fuel. When correction is not required, it is made the reference value zero. On the other hand, the disturbance correction value ΔVD is for compensating for disturbances which can be detected by sensors etc. among the disturbances causing the engine state to deviate from the reference state, for example, the intake temperature and the engine cooling water temperature. When correction is not required, it is made the reference value zero.

Figure 14:
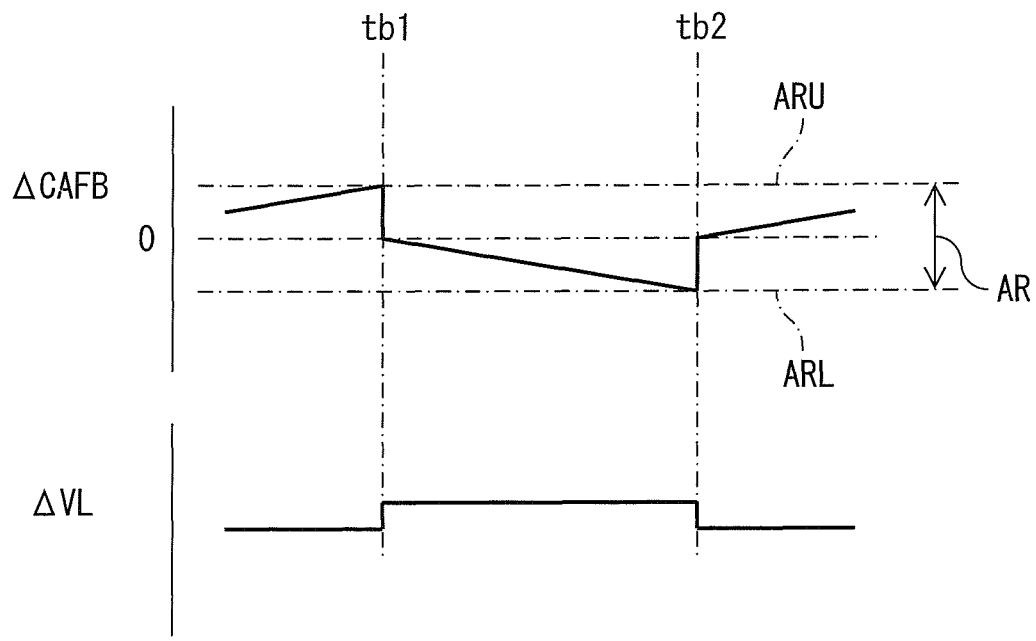
FIG. 14 is a time chart which shows a change of a learned value $\Delta VL$.

The learned value ΔVL is updated so that the feedback correction value ΔCAFB does not greatly deviate from the reference value. That is, as shown in FIG. 14, if, at the time tb1, the feedback correction value ΔCAFB becomes larger than the upper limit value ARU of the allowable range AR, the learned value ΔVL is increased in a step manner and the feedback correction value ΔCAFB is returned to the reference value in a step manner. On the other hand, if, at the time tb2, the feedback correction value ΔCAFB becomes smaller than the lower limit value ARL of the allowable range AR, the learned value ΔVL is reduced in a step manner and the feedback correction value ΔCAFB is returned to the reference value in a step manner. If doing this, the feedback correction value ΔCAFB is kept from greatly deviating from the reference value and the controllability is improved.

Next, referring to FIG. 15, the method of calculation of the learned value ΔVL will be explained. If referring to FIG. 15, the base in-cylinder volume VBp at the previous combustion, the base crank angle CA50Bp at the previous combustion, the crank angle CA50Fp where the combustion ratio became 50% in the previous combustion, and the in-cylinder volume where the combustion ratio becomes 50% at the crank angle CA50Fp at the previous combustion, that is, the previous in-cylinder volume VFp, are shown. Further, in FIG. 15, ΔCAFp shows the difference of the crank angle CA50Fp where the combustion ratio became 50% in the previous combustion from the base crank angle CA50Bp at the previous combustion (ΔCAFp=CA50Fp−CA50Bp), while ΔVFp shows the difference of the previous in-cylinder volume VFp from the base in-cylinder volume VBp at the previous combustion (ΔVFp=VFp−VBp).

In the previous combustion, the base ignition timing SAB is corrected by the feedback correction value ΔCAFB and crank angle correction value ΔCAC. Due to this, the base crank angle CA50Bp is corrected by the crank angle difference ΔCAFp. If converting the crank angle difference ΔCAFp to the difference in in-cylinder volume, it becomes the in-cylinder volume difference ΔVFp. That is, at the previous combustion, to maintain the level of knocking at the target level, it was necessary to correct the base in-cylinder volume VBp by the in-cylinder volume difference ΔVFp.

Therefore, in this embodiment according to the present invention, this in-cylinder volume difference ΔVFp is set to the learned value ΔVL. As a result, it is possible to make steady corrections to the base in-cylinder volume VB by the learned value ΔVL.

The in-cylinder volume difference ΔVFp is calculated as follows. That is, the crank angle difference ΔCAFp at the previous combustion is stored as the total of the feedback correction value ΔCAFB and crank angle correction value ΔCAC at the previous combustion. The crank angle difference ΔCAFp at the previous combustion is added to the base crank angle CA50Bp in the previous combustion to calculate the crank angle CA50Fp where by combustion ratio became 50% at the previous combustion (CA50Fp=CA50Bp+ΔCAFp). Next, the in-cylinder volume VFp at the crank angle CA50Fp is calculated by using the map of FIG. 12. Next, the in-cylinder volume difference ΔVFp is calculated (ΔVFp=VFp−VBp).

On the other hand, the disturbance correction value ΔVD is for example calculated from the following formula (5).

$$\Delta VD = \Delta vd1 + \Delta vd2 \qquad (5)$$

The correction value Δvd1 is a correction value which compensates for the deviation of the intake temperature from the reference intake temperature which forms the above-mentioned reference state, while the correction value Δvd2 is a correction value which compensates for the deviation of the engine cooling water temperature THW from the reference water temperature which constitutes the above-mentioned reference state. These correction values Δvd1 and Δvd2 are stored as values which are converted to differences of the in-cylinder volume in the form of the maps which are shown in FIGS. 16A and 16B in advance in the ROM 32. Note that the intake temperature Ta is detected by an intake temperature sensor which is attached to the intake duct 14, while the engine cooling water temperature THW is detected by a water temperature sensor which is attached to the cylinder block 2. In another embodiment, other parameters which form the reference state, for example, the engine lubricant temperature, may also be considered.

Figure 17:
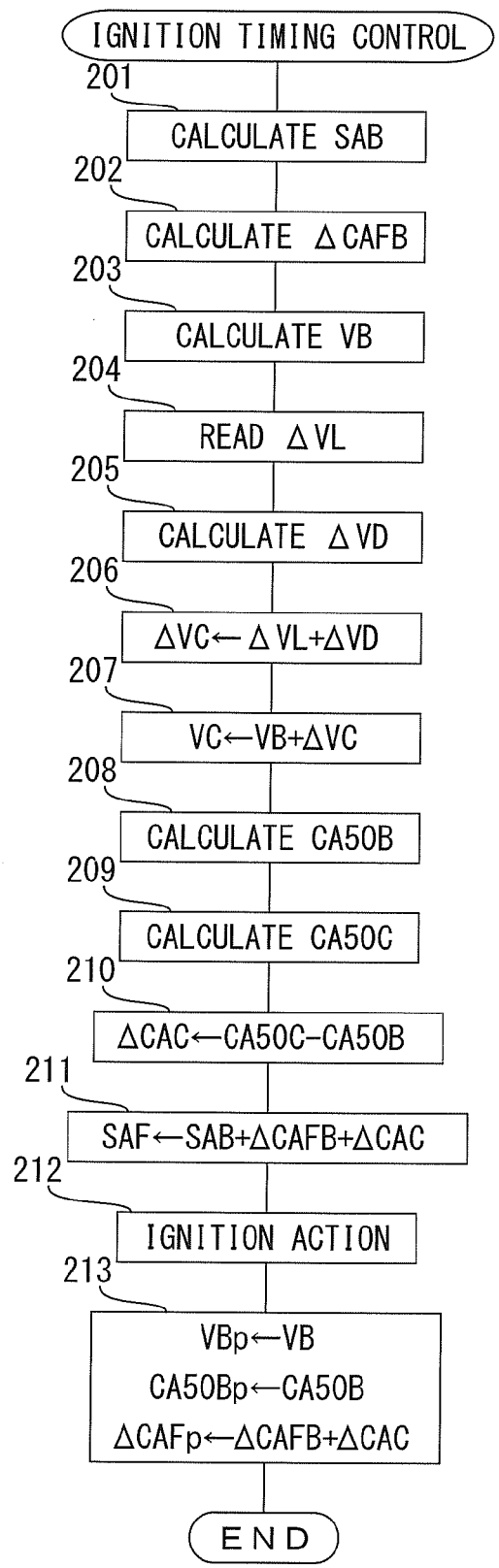
FIG. 17 is a flow chart of an ignition timing control routine.

FIG. 17 shows the routine of control of the ignition timing in an embodiment according to the present invention. This routine is executed by interruption every certain time period.

Figure 18:
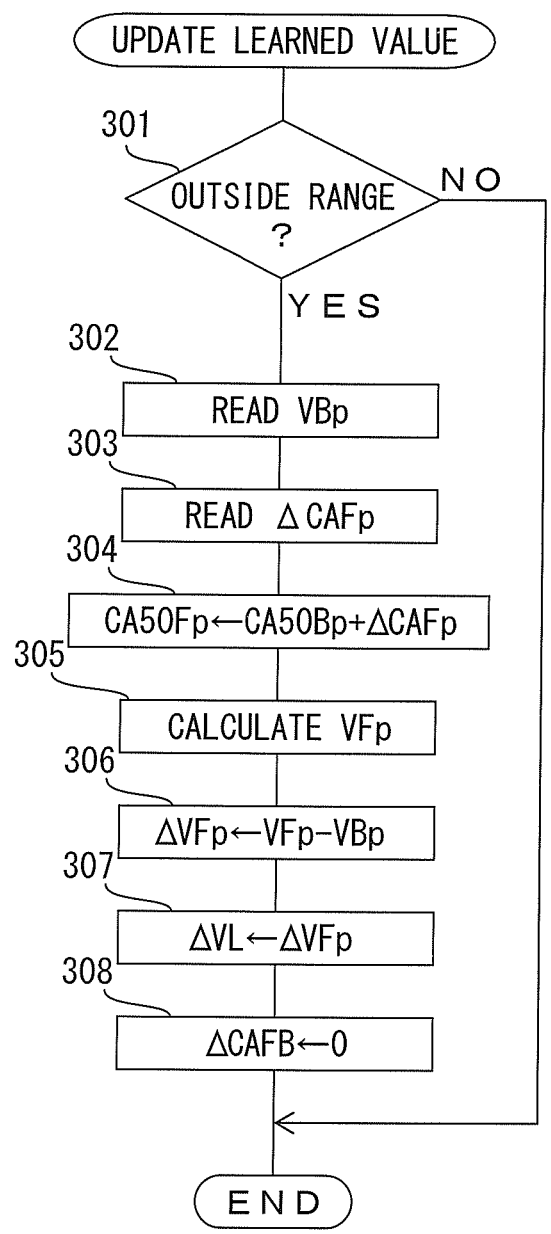
FIG. 18 is a flow chart of a learned value calculation routine.

Referring to FIG. 17, at step 201, the base ignition timing SAB is calculated by using the map of FIG. 6. At the next step 202, the routine for calculation of the feedback correction value ΔCAFB is performed. This routine is shown in FIG. 8. At the next step 203, the base in-cylinder volume VB is calculated by using the map of FIG. 11. At the next step 204, the learned value ΔVL is read. The learned value ΔVL is updated by the routine which is shown in FIG. 18. At the next step 205, the correction values Δvd1, Δvd2 are calculated by using the maps of FIGS. 16A and 16B and disturbance correction value ΔVD is calculated (ΔVD=Δvd1+Δvd2). At the next step 206, the in-cylinder volume correction values ΔVC is calculated (ΔVC=ΔVL+ΔVD). At the next step 207, the corrected in-cylinder volume VC is calculated (VC=VB+ΔVC). At the next step 208, the base crank angle CA50B is calculated by using the map of FIG. 12. At the next step 209, the corrected crank angle CA50C is calculated by using the map of FIG. 12. At the next step 210, the crank angle correction value ΔCAC is calculated (ΔCAC=CA50C−CA50B). At the next step 211, the ignition timing SAF is calculated (SAF=SAB+ΔCAC+ΔCAFB). At the next step 212, the ignition action is performed by the ignition timing SAF. At the next step 213, the base in-cylinder volume VB and base crank angle CA50B in the present routine are stored as the base in-cylinder volume VBp and base crank angle CA50B at the previous combustion. Further, the total of the correction values in the current routine is stored as the crank angle difference ΔCAFp at the previous combustion (ΔCAFp=ΔCAFB+ΔCAC).

FIG. 18 shows the routine for updating the learned value ΔVL in an embodiment according to the present invention. This routine is executed by interruption every certain time period.

Referring to FIG. 18, at step 301, it is judged if the feedback correction value ΔCAFB is inside the allowable range AR. When the feedback correction value ΔCAFB is inside the allowable range AR, the processing cycle is ended. That is, the feedback correction value ΔCAFB is held. As opposed to this, when the feedback correction value ΔCAFB is outside the allowable range AR, next the routine proceeds to step 302 where the base in-cylinder volume VBp at the previous combustion is read. At the next step 303, the crank angle difference ΔCAFp at the previous combustion is read. At the next step 304, the crank angle CA50Fp at the previous combustion is calculated (CA50Fp=CA50Bp+ΔCAFp). At the next step 305, the in-cylinder volume VFp at the crank angle CA50Fp is calculated from the map of FIG. 12. At the next step 306, the in-cylinder volume difference ΔVFp is calculated (ΔVFp=VFp−VBp). At the next step 307, the in-cylinder volume difference ΔVFp is set to the learned value ΔVL. At the next step 308, the feedback correction value ΔCAFB is returned to the reference value zero.

Therefore, in the embodiment according to the present invention, the base ignition timing SAB is calculated, the feedback correction value ΔCAFB is calculated, the base crank angle CA50B and the base in-cylinder volume VB are calculated, and the base in-cylinder volume VB is corrected by the learned value ΔVL whereby the corrected in-cylinder volume VC is calculated, the corrected crank angle CA50C is calculated, the crank angle correction value ΔCAC is calculated, and the base ignition timing SAB is corrected by the feedback correction value ΔCAFB and crank angle correction value ΔCAC. Further, the previous in-cylinder volume VFp is calculated, the in-cylinder volume difference ΔVFp is calculated, and the in-cylinder volume difference ΔVFp is used as the basis to update the learned value ΔVL.

In this regard, the previous in-cylinder volume VFp which was explained with reference to FIG. 15 can be expressed using the in-cylinder volume difference ΔVFp as shown in the following formula (6).

$$VFp=VBp+\Delta VFp \tag{6}$$

In the above-mentioned embodiment, the in-cylinder volume difference ΔVFp is set to the learned value ΔVL. In this case, it may be considered that the in-cylinder volume difference ΔVFp has been replaced with a learned value ΔVL in the form of the in-cylinder volume difference.

As opposed to this, if using the rate of change RL of the in-cylinder volume (=ΔVFp/VBp), the previous in-cylinder volume VFp can be expressed as shown in the following formula (7).

$$VFp=VBp\cdot(1+RL) \tag{7}$$

On the other hand, the above-mentioned disturbance correction value ΔVD can be considered to compensate for disturbance which can be detected by a sensor etc. in the form of an in-cylinder volume difference.

However, disturbance which can be detected by a sensor etc. can also be compensated by a disturbance correction value in the form of the rate of change of the in-cylinder volume. If expressing the disturbance correction value in this case by RD, the disturbance correction value RD is calculated from, for example, the following formula (8).

$$RD=rd1\cdot rd2 \tag{8}$$

The correction value rd1 is a correction value which compensates for the deviation of the intake temperature from the reference intake temperature which forms the reference state, while the correction values rd2 is a correction value which compensates for the deviation of the engine cooling water temperature THW from the above reference water temperature which forms the reference state. These correction values rd1 and r2 are stored as values which are converted to rates of change of the in-cylinder volume in the form of the maps which are shown in FIGS. 19A and 19B in advance in the ROM 32.

This being so, if setting the rate of change of the in-cylinder volume RL to the learned value and using the disturbance correction value RD, the corrected in-cylinder volume VC can be calculated from the following formula (9).

$$VC=VB\cdot(1+RL)\cdot(1+RD) \tag{9}$$

In this case, it may be considered that the in-cylinder volume difference ΔVFp has been replaced with a learned value RL in the form of the rate of change of the in-cylinder volume. However, the learned value RL in this case is not based on the in-cylinder volume difference but is updated based on the rate of change of the in-cylinder volume. As opposed to this, in the embodiment which is shown from FIG. 1 to FIG. 18, the learned value ΔVL is not based on the rate of change of the in-cylinder volume, but is updated based on the in-cylinder volume difference.

Next, another embodiment according to the present invention will be explained. In this other embodiment according to the present invention, the corrected in-cylinder volume VC is calculated from the following formula (10).

$$VC=(VB+\Delta VLd)\cdot(1+RLf)\cdot(1+RD) \tag{10}$$

ΔVLd indicates a learned value in the form of the in-cylinder volume difference, while RLf indicates a learned value in the form of the rate of change of the in-cylinder volume. These are calculated by the following formulas (11) and (12) by using the distribution coefficient "r" (0≤r≤1).

$$\Delta VLd=\Delta VFp\cdot r \tag{11}$$

$$RLf=\Delta VFp\cdot(1-r) \tag{12}$$

Figure 15:
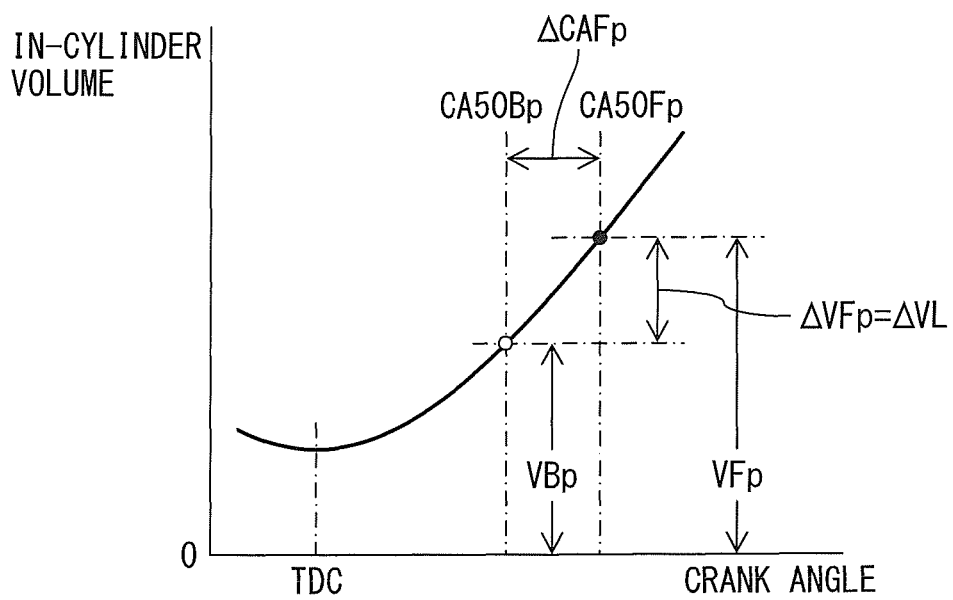
FIG. 15 is a graph which explains a method of calculation of a learned value $\Delta VL$.

In this case, it may be considered that part of the in-cylinder volume difference ΔVFp which is shown in FIG. 15 has been replaced with a learned value ΔVLd in the form of the in-cylinder volume difference, while the remainder of the in-cylinder volume difference ΔVFp has been replaced with a learned value RLf in the form of the rate of change of the in-cylinder volume.

According to the inventors etc., it was confirmed that to compensate for the amount of deposits which form on the wall surface inside of a combustion chamber, it is preferable to use a learned value ΔVLd in the form of the in-cylinder volume difference, while to compensate for the fuel properties such as the octane value, it is preferable to use a learned value RLf in the form of the rate of change of the in-cylinder volume. This is because if the amount of deposits which form on the wall surface inside of a combustion chamber changes, the in-cylinder volume will change by the amount of change of the deposits and the amount of change of the deposits is not dependent on the base in-cylinder volume. On the other hand, if the fuel properties change, the in-cylinder volume itself will not change, however the in-cylinder temperature and the in-cylinder pressure which affect the level of knocking will change. The amounts of change of the in-cylinder temperature and the in-cylinder pressure depend on the base in-cylinder volume. Therefore, in another embodiment according to the present invention, the two learned values ΔVLd, RLf are used. As a result, the level of knocking can be reliably maintained at the target level.

The distribution coefficient "r" is stored as a function of the engine operating state, for example, the engine load L and engine speed Ne, in the form of a map which is shown in FIG. 20 in advance in the ROM 32.

FIG. 21 shows the routine for control of the ignition timing in another embodiment according to the present invention. This routine is executed by interruption every certain time period.

Referring to FIG. 21, at step 201, the base ignition timing SAB is calculated by using the map of FIG. 6. At the next step 202, the routine for calculation of the feedback correction value ΔCAFB is executed. This routine is shown in FIG. 8. At the next step 203, the base in-cylinder volume VB is calculated by using the map of FIG. 11. At the next step 204a, the learned values ΔVLd, RLf are read. The learned values ΔVLd, RLf are updated by the routine which is shown in FIG. 22. At the next step 205a, the correction values rd1, rd2 are calculated by using the maps of FIGS. 19A and 19B and the disturbance correction value RD is calculated (RD=rd1·rd2). At the next step 207a, the corrected in-cylinder volume VC is calculated (VC=(VB+ΔVLd)·(1+RLf)·(1+RD)). At the next step 208, the base crank angle CA50B is calculated by using the map of FIG. 12. At the next step 209, the corrected crank angle CA50C is calculated by using the map of FIG. 12. At the next step 210, the crank angle correction value ΔCAC is calculated (ΔCAC=CA50C−CA50B). At the next step 211, the ignition timing SAF is calculated (SAF=SAB+ΔCAC+ΔCAFB). At the next step 212, the ignition action is performed by the ignition timing SAF. At the next step 213, the base in-cylinder volume VB and base crank angle CA50B in the current routine are stored as the base in-cylinder volume VBp and base crank angle CA50B in the previous combustion. Further, the total of the correction values at the current routine is stored as the crank angle difference ΔCAFp at the previous combustion (ΔCAFp=ΔCAFB+ΔCAC).

FIG. 22 shows the routine for updating the learned value ΔVL of another embodiment according to the present invention. This routine is executed by interruption every certain time period.

Referring to FIG. 22, at step 301, it is judged if the feedback correction value ΔCAFB is in the allowable range AR. When the feedback correction value ΔCAFB is in the allowable range AR, the processing cycle is ended. That is, the feedback correction value ΔCAFB is maintained. As opposed to this, when the feedback correction value ΔCAFB is outside of the allowable range AR, next the routine proceeds to step 302 where the base in-cylinder volume VBp at the previous combustion is read. At the next step 303, the crank angle difference ΔCAFp at the previous combustion is read. At the next step 304, the crank angle CA50Fp at the previous combustion is calculated (CA50Fp=CA50Bp+ΔCAFp). At the next step 305, the in-cylinder volume VFp at the crank angle CA50Fp is calculated from the map of FIG. 12. At the next step 306, the in-cylinder volume difference ΔVFp is calculated (ΔVFp=VFp−VBp). At the next step 307a, the distribution coefficient "r" is calculated by using the map of FIG. 20. At the next step 307b, the learned value ΔVLd in the form of the in-cylinder volume difference is calculated (ΔVLd=ΔVFp·r). At the next step 307c, the learned value RLf in the form of the rate of change of the in-cylinder volume is calculated (RLf=ΔVFp·(1−r)). At the next step 308, the feedback correction value ΔCAFB is returned to the reference value zero.

In this way, in another embodiment according to the present invention, the learned value is updated based on the in-cylinder volume difference and rate of change of the in-cylinder volume.

The present invention can reliably maintain the level of knocking at a target level regardless of the configuration of an internal combustion engine.

While the invention has been described by reference to specific embodiments chosen for purposes of illustration, it should be apparent that numerous modifications could be made thereto, by those skilled in the art, without departing from the basic concept and scope of the invention.

This application claims the benefit of JP Application No. 2013-060523, the entire disclosure of which is incorporated by reference herein.

The invention claimed is:

1. An ignition timing control system comprising:
a spark ignition type internal combustion engine;
a knock sensor that detects a level of knocking of the spark ignition type internal combustion engine; and
an electronic control unit operatively connected to the spark ignition type internal combustion engine, the electronic control unit configured to:
calculate a base ignition timing based on an engine operating state of the spark ignition type internal combustion engine,
calculate a feedback correction value that corrects the base ignition timing so that the detected level of knocking by the knock sensor becomes a target level,
calculate a crank angle by which a combustion ratio becomes a predetermined set ratio when assuming combustion was performed by the base ignition timing as a base crank angle and an in-cylinder volume at the base crank angle as a base in-cylinder volume,
correct the base in-cylinder volume by a learned value so as to calculate a corrected in-cylinder volume,
calculate the crank angle by which the corrected in-cylinder volume is obtained as a corrected crank angle,
calculate a difference of the corrected crank angle from the base crank angle as a crank angle correction value,
correct the base ignition timing by the feedback correction value and crank angle correction value,
calculate an in-cylinder volume at the crank angle by which the combustion ratio becomes a set ratio in the previous combustion as a previous in-cylinder volume,
calculate a difference of the previous in-cylinder volume from the base in-cylinder volume at the previous combustion,
update the learned value based on the difference of the previous in-cylinder volume from the base in-cylinder volume at the previous combustion, and
control the spark ignition type internal combustion engine based on the updated learned value.

2. The ignition timing control system according to claim 1, wherein the electronic control unit is configured to update the learned value based on the difference of the previous in-cylinder volume from the base in-cylinder volume at the previous combustion and a rate of change of the previous in-cylinder volume from the base in-cylinder volume at the previous combustion.

3. The ignition timing control system according to claim 1, wherein the electronic control unit is configured to maintain the learned value when the feedback correction value is within an allowable range and update the learned value when the feedback correction value is outside the allowable range.

4. The ignition timing control system according to claim 1, wherein the set ratio is 50%.

* * * * *